United States Patent
Reed et al.

(10) Patent No.: US 6,771,665 B1
(45) Date of Patent: Aug. 3, 2004

(54) MATCHING OF RADIUS REQUEST AND RESPONSE PACKETS DURING HIGH TRAFFIC VOLUME

(75) Inventors: Scott K. Reed, Knoxville, TN (US);
Gregory Weber, Knoxville, TN (US);
Mark Eklund, Knoxville, TN (US);
Robert Sargent, Knoxville, TN (US);
Steven J. Rich, Knoxville, TN (US)

(73) Assignee: Cisco Technology, Inc., San Jose, CA (US)

( * ) Notice: Subject to any disclaimer, the term of this patent is extended or adjusted under 35 U.S.C. 154(b) by 821 days.

(21) Appl. No.: 09/652,762

(22) Filed: Aug. 31, 2000

(51) Int. Cl.$^7$ .............................. H04J 3/26; H04L 12/22
(52) U.S. Cl. ...................... 370/475; 709/217
(58) Field of Search .................. 370/252, 389, 370/474, 475; 709/217

(56) References Cited

U.S. PATENT DOCUMENTS

| | | | |
|---|---|---|---|
| 4,439,763 A | 3/1984 | Limb ..................... 340/825.5 |
| 4,506,358 A | 3/1985 | Montgomery ................ 370/60 |
| 4,532,626 A | 7/1985 | Flores et al. .................. 370/85 |
| 4,769,810 A | 9/1988 | Eckberg, Jr. et al. ......... 370/60 |
| 4,769,811 A | 9/1988 | Eckberg, Jr. et al. ......... 370/60 |
| 4,922,486 A | 5/1990 | Lidinsky et al. .............. 370/60 |
| 5,014,265 A | 5/1991 | Hahne et al. ................. 370/60 |
| 5,241,594 A | 8/1993 | Kung ............................ 380/4 |
| 5,280,470 A | 1/1994 | Buhrke et al. ................ 370/13 |
| 5,303,237 A | 4/1994 | Bergman et al. ........... 370/85.6 |
| 5,313,454 A | 5/1994 | Bustini et al. ................ 370/13 |
| 5,359,592 A | 10/1994 | Corbalis et al. .............. 370/17 |
| 5,430,715 A | 7/1995 | Corbalis et al. .............. 370/54 |
| 5,473,607 A | 12/1995 | Hausman et al. ......... 370/85.13 |
| 5,485,455 A | 1/1996 | Dobbins et al. ............... 370/60 |
| 5,655,077 A | 8/1997 | Jones et al. ............. 395/187.01 |
| 5,671,354 A | 9/1997 | Ito et al. ................ 395/187.01 |

(List continued on next page.)

FOREIGN PATENT DOCUMENTS

WO 99/53408 10/1999 ............ G06F/15/16

OTHER PUBLICATIONS

Rigney, et al., "Remote Authentication Dial In User Service (RADIUS)", Apr. 1997, Network Working Group, RFC 2138, pp. 1–57.
Carrel, D. et al. The TACACS+ Protocol, Version 1.78, Cisco Systems, Inc., printed from ftp://ftp-eng.cisco.com/gdweber/tac-rfc.1.78.txt on Oct. 23, 2000.

*Primary Examiner*—Melvin Marcelo
(74) *Attorney, Agent, or Firm*—Thelen Reid & Priest LLP; Marc S. Hanish

(57) ABSTRACT

A solution for matching RADIUS request packets with corresponding RADIUS response packets when the number of simultaneous outstanding requests is greater than 256 involves using a sixteen-octet authenticator field in each packet. For each response packet that arrives, the identifier of the packet is compared in turn with the identifier of each outstanding request packet. If the identifiers match, the authenticators are then compared. If the results of the comparison indicate a match, the packet is accepted and no further processing of the outstanding requests is required. Otherwise, a search of the outstanding request packets is continued. This solution allows for more than 256 simultaneous outstanding RADIUS requests and only encounters a mismatch or ambiguous match with a probability of one in $3.4 \times 10^{38}$ packets.

30 Claims, 2 Drawing Sheets

U.S. PATENT DOCUMENTS

| | | | |
|---|---|---|---|
| 5,684,950 A | 11/1997 | Dare et al. | 395/187.01 |
| 5,715,394 A | 2/1998 | Jabs | 395/200.11 |
| 5,802,047 A | 9/1998 | Kinoshita | 370/359 |
| 5,812,529 A | 9/1998 | Czarnik et al. | 370/245 |
| 5,815,665 A | 9/1998 | Teper et al. | 395/200.59 |
| 5,835,727 A | 11/1998 | Wong et al. | 395/200.68 |
| 5,898,780 A | 4/1999 | Liu et al. | 380/25 |
| 5,922,051 A | 7/1999 | Sidey | 709/223 |
| 5,944,824 A | 8/1999 | He | 713/201 |
| 5,987,232 A | 11/1999 | Tabuki | 395/187.01 |
| 5,991,810 A | 11/1999 | Shapiro et al. | 709/229 |
| 6,006,334 A | 12/1999 | Nguyen et al. | 713/202 |
| 6,011,910 A | 1/2000 | Chau et al. | 395/200.59 |
| 6,021,496 A | 2/2000 | Dutcher et al. | 713/202 |
| 6,047,376 A | 4/2000 | Hosoe | 713/201 |
| 6,092,196 A | 7/2000 | Reiche | 713/200 |
| 6,119,160 A | 9/2000 | Zhang et al. | 709/224 |
| 6,141,687 A | 10/2000 | Blair | 709/225 |
| 2002/0012339 A1 * | 1/2002 | Wenzel et al. | 370/352 |
| 2002/0026573 A1 * | 2/2002 | Park | 713/155 |

* cited by examiner

MATCHING OF RADIUS REQUEST AND RESPONSE PACKETS DURING HIGH TRAFFIC VOLUME

BACKGROUND OF THE INVENTION

1. Field of the Invention

The present invention relates to the field of network communications. More specifically, the present invention relates to matching of RADIUS request packets with corresponding RADIUS response packets.

2. The Background

Remote Authentication Dial In User Service (RADIUS) is a protocol for carrying authentication, authorization, and configuration information between a Network Access Server (NAS) and a shared Authentication Server in a computer network. Once a client is configured to use RADIUS, users of the client may present authentication data to the client, such as by using a username and password prompt. When the client has received the authentication data, it may desire to authenticate using RADIUS. In doing so, it must create a RADIUS "Access-Request" packet containing the authentication data and additional information, such as the port ID the user is accessing.

The RADIUS "Access-Request" Packet may then be transmitted over the network to a RADIUS server, which validates the sending client. If the client is valid, the RADIUS server consults a user database to find the user whose name matches the request. A corresponding record in the database contains information regarding how much access the user may have and what requirements must be fulfilled before access is granted. The RADIUS server may then compare the authentication data received via the RADIUS "access-request" packet with this record to determine if the user is authenticated. It may then send an "Access-Accept", "Access-Reject", or "Access-Challenge" response packet back to the client. A similar process may be invoked for accounting requests.

The RADIUS protocol provides for a one-octet identifier in request and response packets. A value is assigned to the identifier when an "access-request" packet is sent. The RADIUS server then takes this identifier and copies it into whatever response packet is sent, ensuring that corresponding request and response packets have the same identifier and thus may be matched up by the client when the response packet is received.

However, when traffic is heavy, it is possible to have more than two hundred and fifty-six outstanding simultaneous request packets from a single client. Since a one-octet identifier only allows for two hundred and fifty-six unique identifiers, this creates a problem when traffic is heavy.

One solution is to alter the User Datagram Protocol (UDP) source port used for the packets when more than two hundred and fifty-six RADIUS request packets are outstanding. The client may then match both the UDP port and the identifier to correspond RADIUS requests and response packets. Unfortunately, many companies have designed their network hardware to utilize a fixed UDP port. Furthermore, these different companies often use different fixed ports. Thus, using the UDP port as a solution is not effective.

What is needed is a solution which provides for matching RADIUS request packets with corresponding RADIUS response packets when traffic is heavy enough to require more than two hundred and fifty-six simultaneous outstanding RADIUS request packets.

SUMMARY OF THE INVENTION

A solution for matching RADIUS request packets with corresponding RADIUS response packets when the number of simultaneous outstanding requests is greater than 256 involves using a sixteen-octet authenticator field in each packet. For each response packet that arrives, the identifier of the packet is compared in turn with the identifier of each outstanding request packet. If the identifiers match, the authenticators are then compared. If the results of the comparison indicate a match, the packet is accepted and no further processing of the outstanding requests is required. Otherwise, a search of the outstanding request packets is continued. This solution allows for more than 256 simultaneous outstanding RADIUS requests and only encounters a mismatch or ambiguous match with a probability of one in $3.4 \times 10^{38}$ packets.

DETAILED DESCRIPTION OF A PREFERRED EMBODIMENT

In the following description, a preferred embodiment of the invention is described with regard to preferred process steps and data structures. However, those skilled in the art will recognize, after perusal of this application, that embodiments of the invention may be implemented using at least one general purpose computer operating under program control and/or using a program storage device, and that modification of the general purpose computer to implement the components, process steps, and/or data structures described herein would not require undue invention.

In accordance with a specific embodiment of the present invention, the components, process steps, and/or data structures are implemented using software. This implementation is not intended to be limiting in any way. Different implementations may be used and may include other types of operating systems, computing platforms, and/or computer programs. In addition, those of ordinary skill in the art will readily recognize that devices of a less general purpose nature, such as hardwired devices, devices relying on FPGA (field programmable gate array) or ASIC (application specific integrated circuit) technology, or the like, may also be used without departing from the scope and spirit of the inventive concepts disclosed herewith.

The present invention utilizes an MD5 authenticator, described below, in RADIUS packets to match RADIUS response packets to corresponding RADIUS request packets when more than one outstanding RADIUS request packet is received with the same identifier.

Figure 1:
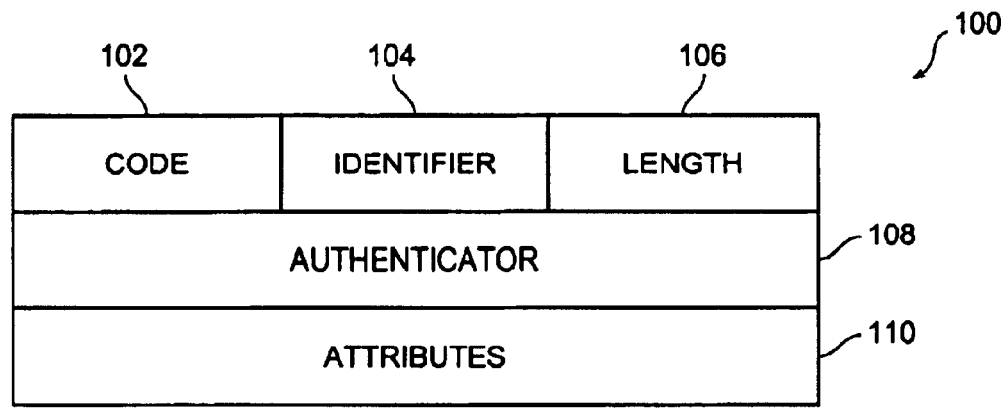
FIG. 1 is a diagram illustrating a RADIUS packet in accordance with a specific embodiment of the present invention.

FIG. 1 is a diagram illustrating a RADIUS packet in accordance with a specific embodiment of the present invention. The packet 100 contains a code field 102, which identifies the type of the RADIUS packet. Codes are currently assigned according to Table 1 below.

TABLE 1

| | |
|---|---|
| 1. | Access-Request (Request) |
| 2. | Access-Accept (Response) |
| 3. | Access-Reject (Response) |
| 4. | Accounting-Request (Request) |
| 5. | Accounting-Response (Response) |
| 11. | Access-Challenge (Response) |
| 12. | Status-Server (experimental) |
| 13. | Status-Client (experimental) |
| 255. | Reserved |

An identifier field 104 is a one-octet field that aids in matching requests and replies. A length field 106 is a two-octet field which indicates the length of the packet, inclusive of the code, identifier, length, authenticator, and attribute fields. The authenticator field 108 is either a 16 octet random number (for Access requests) or a 16 octet MD5 digest of data (for Accounting requests) used as a seed for a random number generator utilized for security verification of packets. An attributes field 110 includes other attributes defined by the RADIUS protocol.

The chances of two 16-byte random numbers being the same are 1 in $2^{128}$ or 1 in $3.4 \times 10^{38}$. Thus, it is useful to use the authenticator field 108 as a sub-identifier, or a "tie-breaker" to differentiate between two response packets with identical identifiers.

Figure 2:
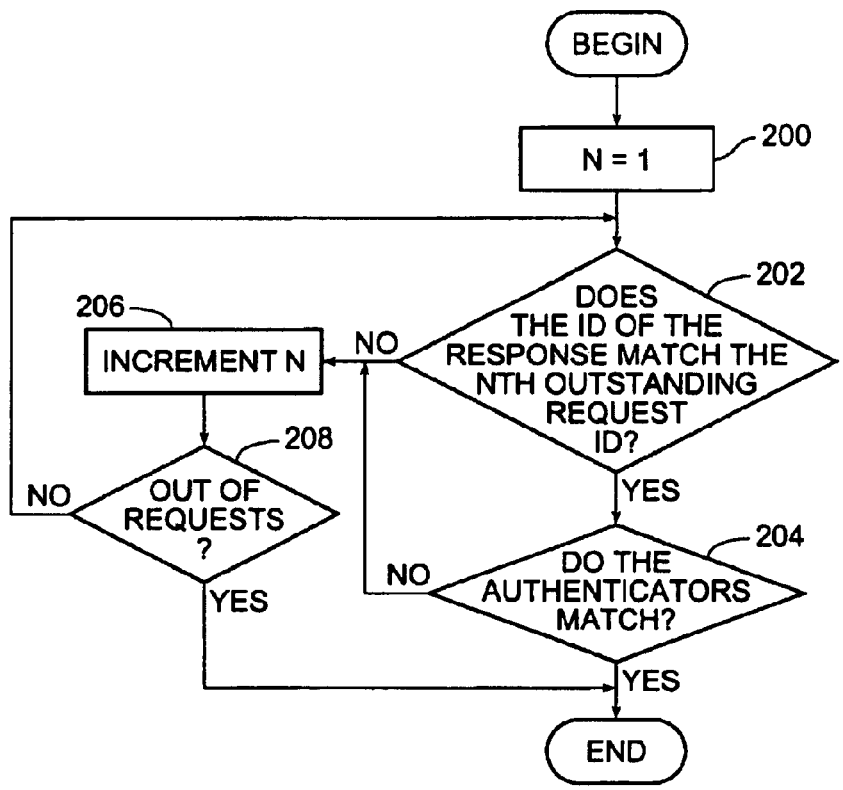
FIG. 2 is a flow diagram illustrating a method for matching a RADIUS response and packet with a corresponding RADIUS request packet from one or more outstanding RADIUS request packets, the packets all having identifier fields and authenticator fields in accordance with a specific embodiment of the present invention.

FIG. 2 is a flow diagram illustrating a method for matching a RADIUS response and packet with a corresponding RADIUS request packet from one or more outstanding RADIUS request packets, the packets all having identifier fields and authenticator fields in accordance with a specific embodiment of the present invention. At 200, a variable N is set to a value of 1. The variable N controls which outstanding request packet in a queue is being examined at any particular time, beginning with 1, indicating the first request packet in the queue. Then, at 202, it is determined if the identifier field of the nth request packet matches the identifier field of the RADIUS response packet. This may include examining the identifier fields of the RADIUS response packet and the nth of the one or more RADIUS request packets and comparing the identifier fields of the RADIUS response packet and the nth of the one or more RADIUS request packets to establish whether any are identical. If there is a match, the process moves to 204, where it is determined if the authenticator field of the nth request packet matches the authenticator field of the RADIUS response packet. This may include examining the authenticator fields of the RADIUS response packet and the nth of the one or more RADIUS request packets and comparing the authenticator fields of the RADIUS response packet and the nth of the one or more RADIUS request packets to establish whether any are identical. If a match has been found, the process may end. If either the identifier field or the authenticator field doesn't match, then the process moves to 206, where N is incremented. At 208, it is determined if there are any more requests in the queue. If not, the process ends. Otherwise, the process returns to 202 with the incremented N to examine the next packet.

Figure 3:
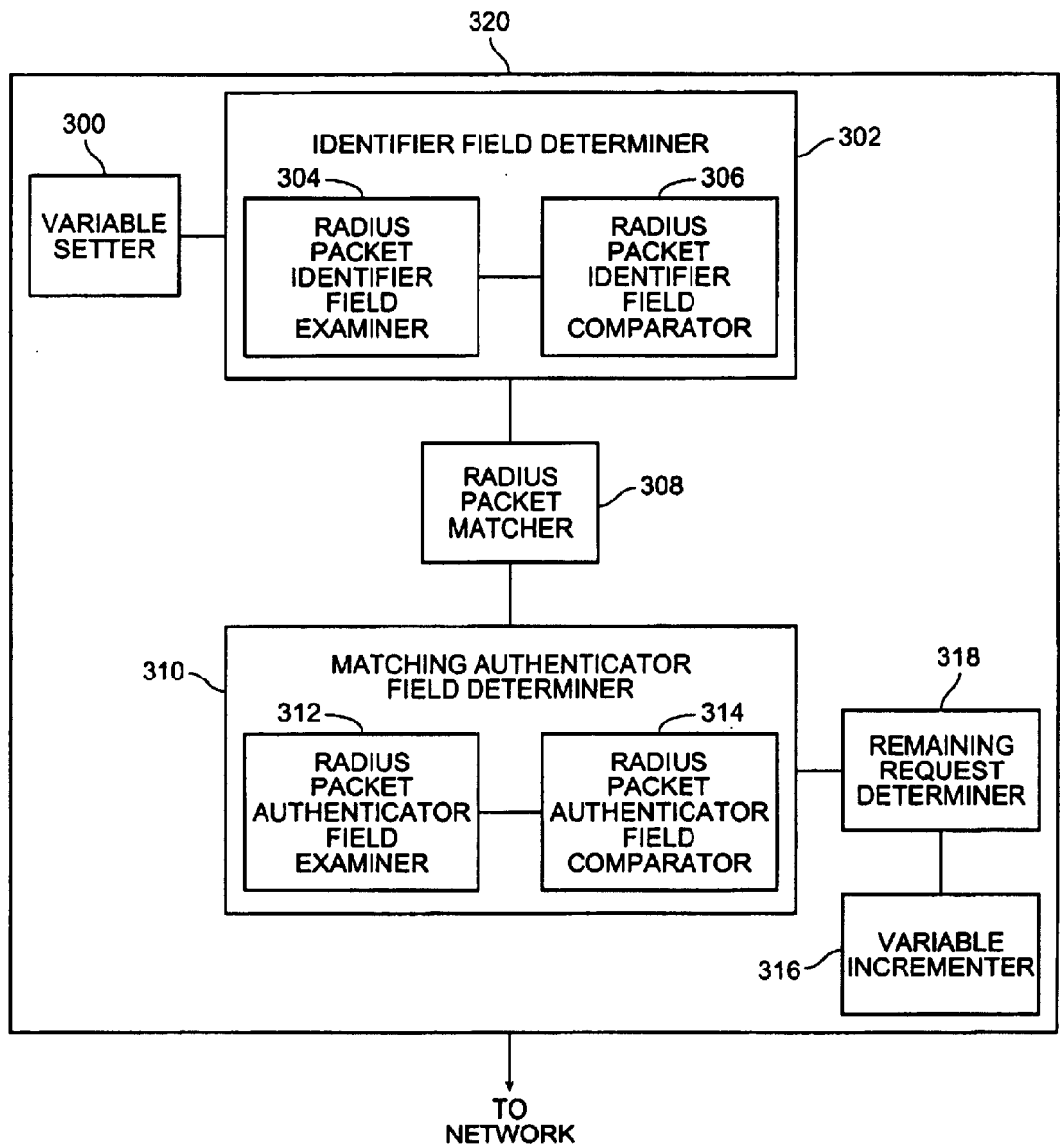
FIG. 3 is a block diagram illustrating an apparatus for matching a RADIUS response and packet with a corresponding RADIUS request packet from one or more outstanding RADIUS request packets, the packets all having identifier fields and authenticator fields in accordance with a specific embodiment of the present invention.

FIG. 3 is a block diagram illustrating an apparatus for matching a RADIUS response and packet with a corresponding RADIUS request packet from one or more outstanding RADIUS request packets, the packets all having identifier fields and authenticator fields in accordance with a specific embodiment of the present invention. A variable setter 300 sets a variable N to an initial value of 1. The variable N controls which outstanding request packet in a queue is being examined at any particular time, beginning with 1, indicating the first request packet in the queue. An identifier field determiner 302 determines if the identifier field of the nth request packet matches the identifier field of the RADIUS response packet. This may include using a RADIUS packet identifier field examiner 304 to examine the identifier fields of the RADIUS response packet and the nth of the one or more RADIUS request packets and a RADIUS packet identifier field comparator 306 coupled to the RADIUS packet identifier field examiner 302 to comparing the identifier fields of the RADIUS response packet and the nth of the one or more RADIUS request packets to establish whether any are identical.

If there is a match, a matching authenticator field determiner 308 coupled to the RADIUS packet identifier field comparator 306 determines if the authenticator field of the nth request packet matches the authenticator field of the RADIUS response packet. This may include using a RADIUS packet authenticator field examiner 310 to examine the authenticator fields of the RADIUS response packet and the nth of the one or more RADIUS request packets and a RADIUS packet authenticator field comparator 312 coupled to the RADIUS packet authenticator field examiner 310 to compare the authenticator fields of the RADIUS response packet and the nth of the one or more RADIUS request packets to establish whether any are identical. If both the authenticator fields and identifier fields match, a RADIUS packet matcher 314 may then match the RADIUS response packet with the nth of the one or more RADIUS request packets.

If either the identifier field or the authenticator field doesn't match, then a variable incrementer 316 increments N. A remaining response determiner 318 coupled to the variable incrementer 316 determines if there are any more responses in the queue. If not, the process ends. Otherwise, the process returns to the identifier field determiner 302 with the incremented N to examine the next packet. The present invention may be located in a network device designed to process packets, such as a router or gateway 320 connected to a network.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for matching a RADIUS response packet with a corresponding RADIUS request packet from one or more RADIUS request packets, the packets all having identifier fields and authenticator fields, and a variable n initially set to 1, including:

determining if the identifier field of the RADIUS response packet matches the identifier field of the nth of the one or more RADIUS request packets;

detecting if the authenticator field of the RADIUS response packet matches the authenticator field of the nth of the one or more RADIUS request;

matching the RADIUS response packet with the nth of the one or more RADIUS request packets if both the identifier field of the RADIUS response packet matches the identifier field of said nth of the one or more RADIUS request packets and the authenticator field of the RADIUS response packet matches the authenticator field of said nth of the one or more RADIUS request packets; and repeating said determining, detecting, and matching with an incremented n if there exist any unexamined RADIUS request packets.

2. The method of claim 1, wherein said determining if the identifier field of the RADIUS response packet matches the identifier field of the nth of the one or more RADIUS request packets includes:

examining the identifier fields of the RADIUS response packet and the nth of the one or more RADIUS request packets; and comparing the identifier fields of the RADIUS response packet and the nth of the one or more RADIUS request packets to establish whether any are identical.

3. The method of claim 1, wherein said detecting if the authenticator field of the RADIUS response packet matches the authenticator field of the nth of the one or more RADIUS request includes:

examining the authenticator fields of the RADIUS response packet and the nth of the one or more RADIUS request packets; and comparing the authenticator fields of the RADIUS response packet and the nth of the one or more RADIUS request packets to establish whether any are identical.

4. A method for matching an access response packet with a corresponding access request packet from one or more access request packets, the packets all having identifier fields and authenticator fields, and a variable n initially set to 1, including:

determining if the identifier field of the access response packet matches the identifier field of the nth of the one or more access request packets;

detecting if the authenticator field of the access response packet matches the authenticator field of the nth of the one or more access request;

matching the access response packet with the nth of the one or more access request packets if both the identifier field of the access response packet matches the identifier field of said nth of the one or more access request packets and the authenticator field of the access response packet matches the authenticator field of said nth of the one or more access request packets; and repeating said determining, detecting, and matching with an incremented n if there exist any unexamined access request packets.

5. The method of claim 4, wherein said determining if the identifier field of the access response packet matches the identifier field of the nth of the one or more access request packets includes:

examining the identifier fields of the access response packet and the nth of the one or more access request packets; and comparing the identifier fields of the access response packet and the nth of the one or more access request packets to establish whether any are identical.

6. The method of claim 4, wherein said detecting if the authenticator field of the access response packet matches the authenticator field of the nth of the one or more access request includes:

examining the authenticator fields of the access response packet and the nth of the one or more access request packets; and comparing the authenticator fields of the access response packet and the nth of the one or more access request packets to establish whether any are identical.

7. A method for matching an accounting response packet with a corresponding accounting request packet from one or more accounting request packets, the packets all having identifier fields and authenticator fields, and a variable n initially set to 1, including:

determining if the identifier field of the accounting response packet matches the identifier field of the nth of the one or more accounting request packets;

detecting if the authenticator field of the accounting response packet matches the authenticator field of the nth of the one or more accounting request;

matching the accounting response packet with the nth of the one or more accounting request packets if both the identifier field of the accounting response packet matches the identifier field of said nth of the one or more accounting request packets and the authenticator field of the accounting response packet matches the authenticator field of said nth of the one or more accounting request packets; and repeating said determining, detecting, and matching with an incremented n if there exist any unexamined accounting request packets.

8. The method of claim 7, wherein said determining if the identifier field of the accounting response packet matches the identifier field of the nth of the one or more accounting request packets includes:

examining the identifier fields of the accounting response packet and the nth of the one or more accounting request packets; and comparing the identifier fields of the accounting response packet and the nth of the one or more accounting request packets to establish whether any are identical.

9. The method of claim 7, wherein said detecting if the authenticator field of the accounting response packet matches the authenticator field of the nth of the one or more accounting request includes:

examining the authenticator fields of the accounting response packet and the nth of the one or more accounting request packets; and comparing the authenticator fields of the accounting response packet and the nth of the one or more accounting request packets to establish whether any are identical.

10. An apparatus for matching a RADIUS response packet with a corresponding RADIUS request packet from one or more RADIUS request packets, the packets all having identifier fields and authenticator fields, and a variable n initially set to 1, including:

means for determining if the identifier field of the RADIUS response packet matches the identifier field of the nth of the one or more RADIUS request packets;

means for detecting if the authenticator field of the RADIUS response packet matches the authenticator field of the nth of the one or more RADIUS request;

means for matching the RADIUS response packet with the nth of the one or more RADIUS request packets if both the identifier field of the RADIUS response packet matches the identifier field of said nth of the one or more RADIUS request packets and the authenticator field of the RADIUS response packet matches the authenticator field of said nth of the one or more RADIUS request packets; and means for repeating said determining, detecting, and matching with an incremented n if there exist any unexamined RADIUS request packets.

11. The apparatus of claim 10, wherein said means for determining if the identifier field of the RADIUS response packet matches the identifier field of the nth of the one or more RADIUS request packets includes:

means for examining the identifier fields of the RADIUS response packet and the nth of the one or more RADIUS request packets; and means for comparing the identifier fields of the RADIUS response packet and the nth of the one or more RADIUS request packets to establish whether any are identical.

12. The apparatus of claim 10, wherein said means for detecting if the authenticator field of the RADIUS response packet matches the authenticator field of the nth of the one or more RADIUS request includes:

means for examining the authenticator fields of the RADIUS response packet and the nth of the one or more RADIUS request packets; and means for comparing the authenticator fields of the RADIUS response packet and the nth of the one or more RADIUS request packets to establish whether any are identical.

13. An apparatus for matching an access response packet with a corresponding access request packet from one or more access request packets, the packets all having identifier fields and authenticator fields, and a variable n initially set to 1, including:

means for determining if the identifier field of the access response packet matches the identifier field of the nth of the one or more access request packets;

means for detecting if the authenticator field of the access response packet matches the authenticator field of the nth of the one or more access request;

means for matching the access response packet with the nth of the one or more access request packets if both the identifier field of the access response packet matches the identifier field of said nth of the one or more access request packets and the authenticator field of the access response packet matches the authenticator field of said nth of the one or more access request packets; and means for repeating said determining, detecting, and matching with an incremented n if there exist any unexamined access request packets.

14. The apparatus of claim 13, wherein said means for determining if the identifier field of the access response packet matches the identifier field of the nth of the one or more access request packets includes:

means for examining the identifier fields of the access response packet and the nth of the one or more access request packets; and means for comparing the identifier fields of the access response packet and the nth of the one or more access request packets to establish whether any are identical.

15. The apparatus of claim 13, wherein said means for detecting if the authenticator field of the access response packet matches the authenticator field of the nth of the one or more access request includes:

means for examining the authenticator fields of the access response packet and the nth of the one or more access request packets; and means for comparing the authenticator fields of the access response packet and the nth of the one or more access request packets to establish whether any are identical.

16. An apparatus for matching an accounting response packet with a corresponding accounting request packet from one or more accounting request packets, the packets all having identifier fields and authenticator fields, and a variable n initially set to 1, including:

means for determining if the identifier field of the accounting response packet matches the identifier field of the nth of the one or more accounting request packets;

means for detecting if the authenticator field of the accounting response packet matches the authenticator field of the nth of the one or more accounting request;

means for matching the accounting response packet with the nth of the one or more accounting request packets if both the identifier field of the accounting response packet matches the identifier field of said nth of the one or more accounting request packets and the authenticator field of the accounting response packet matches the authenticator field of said nth of the one or more accounting request packets; and means for repeating said determining, detecting, and matching with an incremented n if there exist any unexamined accounting request packets.

17. The apparatus of claim 16, wherein said means for determining if the identifier field of the accounting response packet matches the identifier field of the nth of the one or more accounting request packets includes:

means for examining the identifier fields of the accounting response packet and the nth of the one or more accounting request packets; and means for comparing the identifier fields of the accounting response packet and the nth of the one or more accounting request packets to establish whether any are identical.

18. The apparatus of claim 16, wherein said means for detecting if the authenticator field of the accounting response packet matches the authenticator field of the nth of the one or more accounting request includes:

means for examining the authenticator fields of the accounting response packet and the nth of the one or more accounting request packets; and means for comparing the authenticator fields of the accounting response packet and the nth of the one or more accounting request packets to establish whether any are identical.

19. A program storage device readable by a machine, tangibly embodying a program of instructions executable by the machine for matching a RADIUS response packet with a corresponding RADIUS request packet from one or more RADIUS request packets, the packets all having identifier fields and authenticator fields, and a variable n initially set to 1, the program method including:

determining if the identifier field of the RADIUS response packet matches the identifier field of the nth of the one or more RADIUS request packets;

detecting if the authenticator field of the RADIUS response packet matches the authenticator field of the nth of the one or more RADIUS request;

matching the RADIUS response packet with the nth of the one or more RADIUS request packets if both the identifier field of the RADIUS response packet matches the identifier field of said nth of the one or more RADIUS request packets and the authenticator field of the RADIUS response packet matches the authenticator field of said nth of the one or more RADIUS request packets; and repeating said determining, detecting, and matching with an incremented n if there exist any unexamined RADIUS request packets.

20. A program storage device readable by a machine, tangibly embodying a program of instructions executable by the machine for matching an access response packet with a corresponding access request packet from one or more access request packets, the packets all having identifier fields and authenticator fields, and a variable n initially set to 1, the program method including:

determining if the identifier field of the access response packet matches the identifier field of the nth of the one or more access request packets;

detecting if the authenticator field of the access response packet matches the authenticator field of the nth of the one or more access request;

matching the access response packet with the nth of the one or more access request packets if both the identifier field of the access response packet matches the identifier field of said nth of the one or more access request packets and the authenticator field of the access response packet matches the authenticator field of said nth of the one or more access request packets; and repeating said determining, detecting, and matching with an incremented n if there exist any unexamined access request packets.

21. A program storage device readable by a machine, tangibly embodying a program of instructions executable by the machine for matching an accounting response packet with a corresponding accounting request packet from one or more accounting request packets, the packets all having identifier fields and authenticator fields, and a variable n initially set to 1, the program method including:

determining if the identifier field of the accounting response packet matches the identifier field of the nth of the one or more accounting request packets;

detecting if the authenticator field of the accounting response packet matches the authenticator field of the nth of the one or more accounting request;

matching the accounting response packet with the nth of the one or more accounting request packets if both the identifier field of the accounting response packet matches the identifier field of said nth of the one or more accounting request packets and the authenticator field of the accounting response packet matches the authenticator field of said nth of the one or more accounting request packets; and repeating said determining, detecting, and matching with an incremented n if there exist any unexamined accounting request packets.

22. An apparatus for matching a RADIUS response packet with a corresponding RADIUS request packet from one or more RADIUS request packets, the packets all having identifier fields and authenticator fields, including:

a matching identifier field determiner;

a RADIUS packet matcher coupled to said matching identifier field determiner;

a matching authenticator field determiner coupled to said RADIUS packet matcher and said matching identifier field determiner.

23. The apparatus of claim 22, wherein said matching identifier field determiner includes:

a RADIUS packet identifier field examiner; and a RADIUS packet identifier field comparator coupled to said RADIUS packet identifier field examiner.

24. The apparatus of claim 22, wherein said matching authenticator field determiner includes:

a RADIUS packet authenticator field examiner; and a RADIUS packet authenticator field comparator coupled to said RADIUS packet authenticator field examiner.

25. An apparatus for matching an access response packet with a corresponding access request packet from one or more access request packets, the packets all having identifier fields and authenticator fields, including:

a matching identifier field determiner;

an access packet matcher coupled to said matching identifier field determiner;

a matching authenticator field determiner coupled to said access packet matcher and said matching identifier field determiner.

26. The apparatus of claim 25, wherein said matching identifier field determiner includes:

an access packet identifier field examiner; and an access packet identifier field comparator coupled to said access packet identifier field examiner.

27. The apparatus of claim 25, wherein said matching authenticator field determiner includes:

an access packet authenticator field examiner; and an access packet authenticator field comparator coupled to said access packet authenticator field examiner.

28. An apparatus for matching an accounting response packet with a corresponding accounting request packet from one or more accounting request packets, the packets all having identifier fields and authenticator fields, including:

a matching identifier field determiner;

an accounting packet matcher coupled to said matching identifier field determiner;

a matching authenticator field determiner coupled to said accounting packet matcher and said matching identifier field determiner.

29. The apparatus of claim 28, wherein said matching identifier field determiner includes:

an accounting packet identifier field examiner; and an accounting packet identifier field comparator coupled to said accounting packet identifier field examiner.

30. The apparatus of claim 28, wherein said matching authenticator field determiner includes:

an accounting packet authenticator field examiner; and an accounting packet authenticator field comparator coupled to said accounting packet authenticator field examiner.

* * * * *